US007920304B2

(12) United States Patent
Tatsuno et al.

(10) Patent No.: US 7,920,304 B2
(45) Date of Patent: Apr. 5, 2011

(54) IMAGE READING DEVICE AND IMAGE FORMING APPARATUS

(75) Inventors: Hibiki Tatsuno, Kawasaki (JP); Yasuo Sakurai, Yokohama (JP); Kiichiro Nishina, Yokohama (JP); Nobuaki Ono, Yokohama (JP); Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 12/358,001

(22) Filed: Jan. 22, 2009

(65) Prior Publication Data

US 2009/0237750 A1  Sep. 24, 2009

(30) Foreign Application Priority Data

Jan. 23, 2008  (JP) ................................. 2008-012525

(51) Int. Cl.
  *H04N 1/04*  (2006.01)
(52) U.S. Cl. ........ 358/475; 358/484; 358/483; 358/482; 358/497
(58) Field of Classification Search .................. 358/484, 358/475, 483, 482, 509, 512–514; 362/217.02, 362/606–609, 615; 399/221, 220, 211, 212; 355/67, 68, 70; 250/205, 587.1, 559.49, 250/208.1, 234–236; 382/312, 318, 319
See application file for complete search history.

(56) References Cited

U.S. PATENT DOCUMENTS

| 3,777,135 A * | 12/1973 | Rees .............................. 362/225 |
| 5,124,837 A | 6/1992 | Ono et al. |
| 7,446,953 B2 | 11/2008 | Itoh et al. |
| 7,742,202 B2 * | 6/2010 | Higashitani ................... 358/484 |
| 2005/0135840 A1 | 6/2005 | Sakurai et al. |
| 2006/0044795 A1 | 3/2006 | Tatsuno |
| 2007/0024977 A1 | 2/2007 | Kawamura et al. |
| 2007/0279712 A1 | 12/2007 | Nishina |
| 2007/0297170 A1 | 12/2007 | Tatsuno |
| 2008/0049207 A1 | 2/2008 | Tatsuno |
| 2008/0062478 A1 | 3/2008 | Tatsuno |
| 2008/0180774 A1 | 7/2008 | Tatsuno |
| 2008/0218724 A1 | 9/2008 | Nishina et al. |
| 2008/0291514 A1 * | 11/2008 | Lin et al. ....................... 358/509 |

FOREIGN PATENT DOCUMENTS

| JP | 2-22679 | 1/1990 |
| JP | 2005-241681 | 9/2005 |
| JP | 2005-311662 | 11/2005 |
| JP | 2006-42016 | 2/2006 |
| JP | 2006-67551 | 3/2006 |
| JP | 2008-109251 | 5/2008 |
| JP | 4170818 | 8/2008 |

\* cited by examiner

*Primary Examiner* — Cheukfan Lee
(74) *Attorney, Agent, or Firm* — Dickstein Shapiro LLP

(57) ABSTRACT

An image reading apparatus includes a plurality of light sources to illuminate a document; an illumination optical system to guide light to a reading target area having a length and a width; a document illuminating device to illuminate the entire document; an image forming optical system to form an image from light reflected from the document; and a sensor provided in an image forming section of the image forming optical system to read the image of the document. The illumination optical system includes a concentration section to control light diffusion, and a reflection section. The reflection section includes at least two integrally configured reflection surfaces, in which a sine value of an angle of reflected light from at least one reflection surface is positive, while a sine value of an angle of reflected light from the rest of at least one reflection surface is negative.

19 Claims, 12 Drawing Sheets

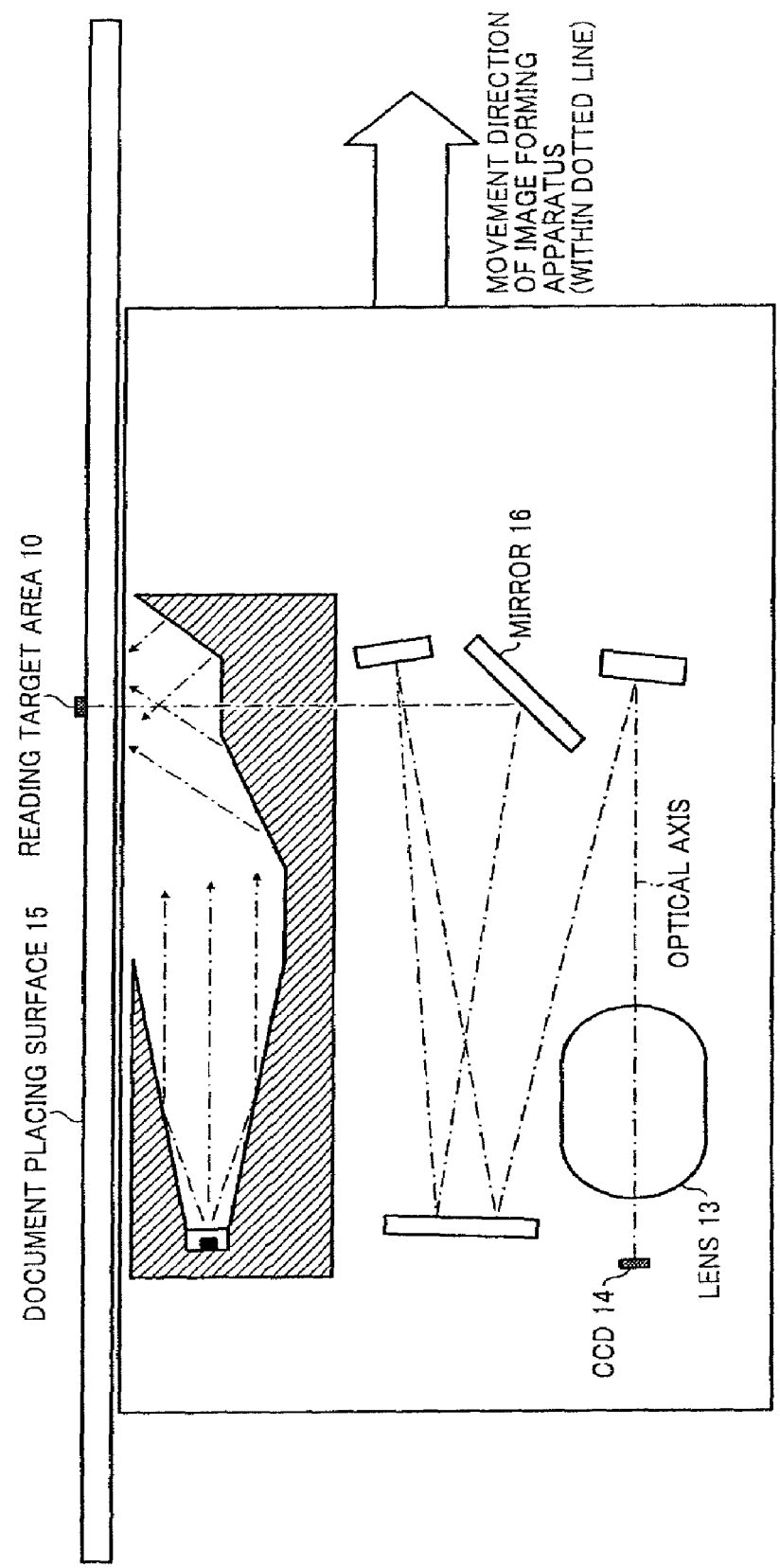

IMAGE READING DEVICE AND IMAGE FORMING APPARATUS

CROSS-REFERENCE TO THE RELATED APPLICATION

This application is based on and claims the priority benefit of Japanese Patent Application No. 2008-012525, filed on Jan. 23, 2008, the disclosure of which is incorporated herein by reference in its entirety.

BACKGROUND OF THE INVENTION

1. Field of the Invention

The present invention relates to an image reading device, particularly to an image reading device employed in a digital copy machine or an image scanner, and an image forming apparatus provided with the image reading device.

2. Description of the Related Art

In recent years, along with the development of light-emitting diodes (hereinafter referred to as LED), the brightness of an LED element has been greatly enhanced. Having advantages such as a long service life, high efficiency, high shock-resistance, monochromatic light emission, etc., the LED is expected to be applied extensively in many illumination-related fields.

For example, the LED is employed in a document illuminating device (a device for illuminating paper), provided in an image reading apparatus like a digital copy machine or an image scanner.

There are proposed various methods for the application of the LED employed in the image reading apparatus. For example, Japanese Patent Application Publication Numbers 2006-67551, 2006-42016, and 2005-241681 disclose that a plurality of LEDs are aligned in parallel with a main scanning direction of a document. In the main scanning direction, light emitted from the plurality of LEDs is diffused by an optical system without being concentrated. In a sub-scanning direction, light emitted from the plurality of LEDs is concentrated by a reflection member, whereby the illuminance of a reading target area on a document placing surface is enhanced.

In addition, Japanese Patent Application Publication Number 2005-311662 discloses that a plurality of LEDs are aligned in parallel with a main scanning direction of a document. In a main scanning direction, light emitted from the plurality of LEDs is diffused by an optical system without being concentrated. In a sub-scanning direction, light emitted from the plurality of LEDs is concentrated by a lens, whereby the illuminance of a reading target area of a document placing surface is enhanced.

Next, it will be explained how the illuminance or illuminance distribution is obtained on the document placing surface when the document is illuminated by the light emitted from the plurality of LEDs.

FIG. 9 shows a schematic configuration of a conventional image reading apparatus. As illustrated in FIG. 9, as to the image reading apparatus employed in the digital copy machine or in the image scanner, an image of the document is obtained by an image pickup element such as a CCD 14 via a readout lens 13.

FIG. 10 is a top view of the document placing surface 15 illustrated in FIG. 9. When an image reading optical system constituting the image reading apparatus is in a fixed state, only image information of an elongated reading target area 10, illustrated in FIG. 10, can be input into the image reading apparatus via the CCD 14. Therefore, via either moving the entire apparatus illustrated in FIG. 9, including an illumination lamp 22, a reflector 21 facing the illumination lamp 22, a plurality of mirrors 16, a lens 13 and the CCD 14, or moving an illumination optical system including the illumination lamp 22 and the reflector 21 in conjunction with the plurality of mirrors 16, the reading target area 10 is moved in a direction of an arrow in FIG. 10. The entire document can be read out via obtaining the image information sequentially by the CCD 14 while the reading target area 10 is being moved in the sub-scanning direction.

At this time, the reading target area 10 illustrated in FIG. 10 is moved quickly. Consequently, the reading time per sheet of the document is shortened, which causes a reduction in an amount of light incident onto the CCD 14 per unit time. Therefore, it is desired to increase the amount of light illuminating the document. Considering this, the methods of confining the light to the sub-scanning direction disclosed in the above-mentioned prior art references are appropriate.

Meanwhile, generally, a uniform illuminance distribution is desirable. FIG. 11 illustrates the relationship between the document placing surface 15 and the CCD 14, when the document placing surface 15 and an image pickup area of the CCD 14 are arranged to be in a conjugate positional relationship in a length direction (the main scanning direction) indicated in FIG. 10. Two examples of an illuminance distribution on the document placing surface 15 are illustrated by a solid line and a dotted line.

In FIG. 11, the solid line represents an illuminance distribution on the document placing surface 15 at a predetermined time, while the dotted line represents an illuminance distribution on the document placing surface 15 when shaking (in the main scanning direction) such as a vibration from outside is undesirably applied to the image reading apparatus at the time. As illustrated by the solid line or the dotted line in FIG. 11, when there is non-uniformity in the illuminance distribution on the document placing surface 15, with respect to a position of high illuminance on the document placing surface 15, a corresponding position on the image pickup area is of high illuminance also. Conversely, with respect to a position of a low illuminance on the document placing surface 15, a corresponding position on the image pickup area is of low illuminance also. If the illuminance distribution on the document placing surface 15 in the main scanning direction is uniform, even if the above-mentioned vibration occurs when the reading target area is moved in the direction of the arrow, indicated in FIG. 10, in order to read the entire document, a density irregularity on a scanned image of the document cannot be generated. However, when the illuminance distribution in the main scanning direction is non-uniform and the above-mentioned vibration occurs, the state illustrated by the solid line may be shifted to the state illustrated by the dotted line. Consequently, the density irregularity is generated partly in the scanned image, which results in deterioration in an image quality.

Therefore, as illustrated in FIG. 12, an illuminance distribution in the main scanning direction over an entire reading target area is desired to be uniform in general. The reason is that when the illuminance distribution is uniform, even if shaking such as the vibration from outside occurs, the illuminance distribution on the image pickup area would not be varied accordingly.

The illuminance distribution in a width direction (sub-scanning direction), as indicated in FIG. 10, is particularly desired to be uniform. However, unfortunately, for example, when the light emitted from a light source is concentrated to the sub-scanning direction, as illustrated in FIGS. 1, 3, and 5 of Japanese Patent Application Publication Number Hei02-22679, a steep illuminance distribution (with a sharp-pointed peak) is formed undesirably on the document placing surface 15, as illustrated by the solid line in FIG. 13. With such a steep illuminance distribution, when the illuminance distribution is instantaneously shifted from a state indicated by the solid line to a state indicated by the dotted line, the amount of light incident on the CCD 14 differs remarkably, as indicated by an arrow of FIG. 13.

Therefore, as illustrated in FIG. 14, in the sub-scanning direction, a uniform illuminance distribution with a certain width (for instance, about 3 mm) is desired. Considering this, a mirror in an oval shape in cross-section illustrated in Japanese Patent Application Publication Number Hei02-22679 is not necessarily the most desirable. Instead, if a cross-section of a mirror is in a curved shape, a parabolic shape is desired. A planar mirror may also be appropriate as long as a light distribution state (illuminance distribution) is uniform.

According to one embodiment of the present invention, since a plurality of point light sources such as an LED light source, an organic EL light source, etc. are employed, which differ from a tubular light source in Japanese Patent Application Publication Number Hei02-22679, when approaching the document placing surface, an illuminance irregularity tends to appear in the main scanning direction (because the respective point light sources are strong in illumination directivity). Therefore, a certain distance needs to be kept between the plurality of point light sources and the document placing surface so as to eliminate such an illuminance irregularity.

In order to miniaturize a document illuminating device while keeping the distance between the above-mentioned plurality of light sources and the document placing surface, the following two characteristics (I) and (II) are desired. Here, FIGS. 15, 16 and 17 illustrate a schematic structure of an image reading apparatus including the plurality of LEDs respectively.

(I) As illustrated in FIGS. 15, 16 and 17, concentration members 17 and 18 are provided only in a light emission direction of an LED 9 (light source). (In general, at the back of the LED 9, a reflection surface is unnecessary because unlike the tubular light source with 360° directivity with respect to an axis thereof, the plurality of LED light sources or organic EL light sources emit the light with a strong directivity in a frontward direction thereof.) Since the reflection surface does not need to be provided at the back of the LED 9, compared with FIG. 1 of Japanese Patent Application Publication Number Hei02-22679, the document illuminating device can be miniaturized in the width direction (sub-scanning direction).

(II) As illustrated in FIG. 17, the light-emitting direction of the LED 9 is arranged to be in parallel with a contact glass 12. In this case, (because although the directivity of the LED is strong, the emitted light diffuses gradually.), by keeping a sufficient distance in movement of the LED 9, the illuminance irregularity in the main scanning direction is eliminated and the document illuminating device is thinned in a height direction.

Here, a problem that needs further considering is that when the illumination fails to reach the entire document to be read out, a black shadow is formed in a read out image of the document. For example, when a book, etc. is opened to be placed on the contact glass 12 (platen), a part between opened pages levitates inevitably due to the structure of the book, thereby such a levitating part between pages is angled to the contact glass 12. Because of the existence of such a levitating part, illumination from only one direction can not illuminate all of the opened pages. Consequently, the problem arises that the black shadow undesirably appears in the read out image of the document.

Conventionally, as to a light source including a cold-cathode tube, as disclosed in Japanese Patent Number 4170878, via providing a reflector facing a light source, a reading target area is illuminated from two directions with respect to a plane perpendicular to a movement direction of a document illuminating device and the reading target area.

However, unfortunately, the above-mentioned "black shadow" problem is not considered in any of Japanese Patent Application Publication Numbers 2006-67551, 2006-42016, 2005-311662 and 2005-241681. In addition, as to Japanese Patent Number 4170818, for the sake of energy conservation, the number of a plurality of LEDs needs to be reduced. If the number of the plurality of LEDs is reduced (since an interval between the LEDs increases accordingly), in order to ensure the illuminance distribution in the main scanning direction, a distance between a light source 6 and the document placing surface needs to be kept adequately, as illustrated in FIG. 1 in Japanese Patent Number 4170878. Therefore, since a distance between the document placing surface and a first mirror needs to be kept adequately, an entire illumination optical system may become large in size.

Although an image reading apparatus is configured with the above consideration, as illustrated in FIGS. 15, 16 and 17, due to respective support structures of respective reflectors, a problem arises that the uniformity of the illuminance distribution deteriorates in the sub-scanning direction.

For example, as illustrated in FIG. 15, the support structures of a reflector 19 and a reflector 20 are simplified at the cost of a decline in a supporting strength thereof. Due to an influence such as an external vibration, etc., the positional relationship between the reading target area 10 and the reflector 19 as well as the reflector 20 is varied easily. Consequently, a problem of two adjacent peaks appearing in the illuminance distribution arises, as illustrated in FIG. 16. (FIG. 16 illustrates an example where, compared with FIG. 15, the reflector 19 and the reflector 20 approach the reading target area.)

In order to improve such an above-mentioned situation, the support structures of both the reflector 19 and the reflector 20 need to be strengthened. However, there are some disadvantages such as the document illuminating device being enlarged or increased in weight.

SUMMARY OF THE INVENTION

The present invention has been accomplished in view of the hitherto unsolved problems of the prior technology and it is an object of the present invention to provide an image reading apparatus and an image forming apparatus which are small-sized and energy-saving by use of a reduced number of light sources, and with which a variance in an illuminance distribution is not easily generated due to a movement (an accompanied vibration or an external vibration) of a document illuminating device included. Compared with a tubular light source, the light source employed is remarkable in energy conservation.

In order to achieve the above object, the present invention provides an image reading apparatus including: a plurality of light sources to illuminate a document; an illumination optical system to guide light emitted from the plurality of light sources to a reading target area in an approximate rectangular shape having a length and a width; a document illuminating device which is moved in a direction of the width to illuminate the entire document; an image forming optical system to form an image from light reflected from the document; and a sensor provided in an image forming section of the image forming optical system to read the image of the document. The illumination optical system includes a concentration section to control a diffusion of light, and a reflection section by which light from a plurality of directions is reflected to illuminate the document. The reflection section includes at least two integrally configured reflection surfaces, in which a sine value of an angle of reflected light from at least one reflection surface is positive, while a sine value of an angle of reflected light from the rest of at least one reflection surface is negative.

BRIEF DESCRIPTION OF THE DRAWINGS

FIG. 2 is a profile schematic view of an image reading apparatus according to a second embodiment of the present invention.

DETAILED DESCRIPTION OF THE PREFERRED EMBODIMENTS

Figure 1A:
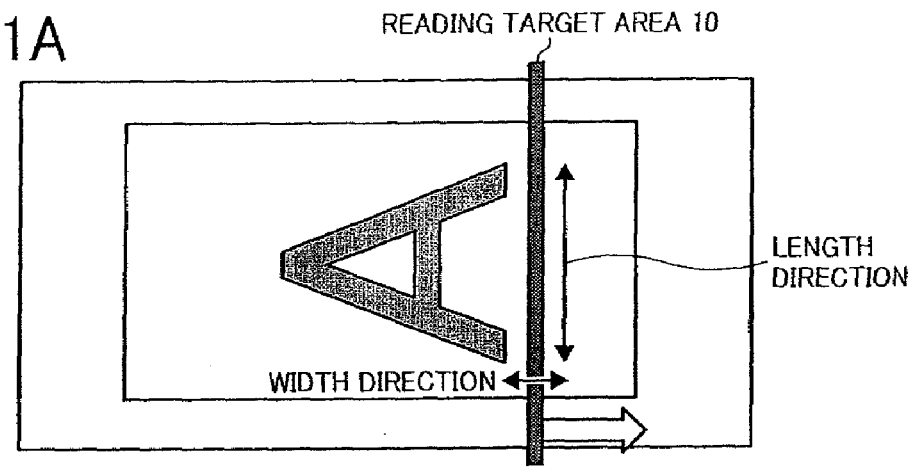
FIG. 1A illustrates a length direction and a width direction of a reading target area on a document placing surface.

Preferred embodiments of the present invention will be explained in detail hereinafter with reference to the accompanying drawings.

First, a basic configuration of an image reading apparatus according to one embodiment of the present invention will be illustrated hereinafter.

(An Image Reading Apparatus)

According to one embodiment of the present invention, the image reading apparatus includes a plurality of light sources to illuminate a document; an illumination optical system to guide light emitted from the plurality of light sources to a reading target area in an approximately rectangular shape having a length and a width; a document illuminating device which is moved in the width direction to illuminate the entire document; an image forming optical system to form an image from light reflected from the document; and a sensor provided in an image forming section of the image forming optical system to read out the image of the document.

The illumination optical system includes a concentration section to concentrate diffused light, and a reflection section to illuminate the document by light from a plurality of directions. The reflection section includes a plurality of integrated reflection surfaces wherein a sine value of an angle of reflected light from at least one reflection surface is positive, while a sine value of an angle of reflected light from at least one reflection surface is negative. Here, the angle of the reflected light refers to an angle formed when the reflected light from the reflection surface is angled to a virtual plane, which includes the reading target area and is perpendicular to the width direction. Either side with respect to the virtual plane is set to be positive.

According to one embodiment of the present invention, the image reading apparatus includes the document illuminating device which is composed of the plurality of the light sources and the illumination optical system. The document illuminating device is driven in the width direction of the reading target area to illuminate the entire document, whereby the entire document can be read out. As for a conventional image reading apparatus, because shaking such as a vibration is generated at the time of the image reading apparatus being driven, a relative positional relationship of respective components of the document illuminating device is varied. Consequently, an illuminance of the read image by the sensor is varied accordingly, which causes deterioration in the image. However, in contrast, according to one embodiment of the present invention, the deterioration of the image can be suppressed via integrating the plurality of reflection surfaces to maintain the relative positional relationship of the plurality of reflection surfaces.

(Concentration Section and Reflection Section)

According to one embodiment of the present invention, a concentration section and a reflection section preferably include a plurality of reflection surfaces which are formed on a plurality of surfaces of plastic or glass moldings. A material for the moldings is not confined to the above-mentioned materials, which allows the application of other heretofore known materials.

Here, the reflection section is preferred to be an integrated reflection member including a plurality of reflection surfaces. In addition, the reflection section including the plurality of reflection surfaces is preferably integrated with the concentration section or one component of the concentration section. Such an integrated constitution enables every component to be equally influenced by a vibration generated at the time of driving a document illuminating device, whereby a variance in the illuminance distribution can be suppressed.

(Reflection Surface)

According to one embodiment of the present invention, a reflection surface refers to an area whose reflectivity is high and is capable of guiding light emitted from the plurality of light sources to the reading target area.

If the reflection surface is formed by vapor deposition of aluminum or coating, the number of processing steps is small, which enables manufacture to be highly efficient. Meanwhile, the reflection surface can be easily formed via bonding a reflective tape to a constructional member of the concentration section and a constructional member of the reflection section of the above-mentioned moldings. The reflective tape is preferably provided with high reflectivity via evaporation or the like on one side of a thin adhesive tape.

According to one embodiment of the present invention, the reflection surface can either be an area unit such as a planar surface, a curved surface or the like, classified by a structure of the surface, or be an area which is capable of guiding light emitted from the plurality of light sources to the reading target area, classified by a function thereof.

For example, as to an integrated member including a plurality of planar surfaces, a surface which guides light emitted from the plurality of light sources to the reading target area can be referred to as the reflection surface; while a surface which does otherwise can be referred to as a non-reflection surface. In this case, an angle is formed between two adjacent reflection surfaces, or one reflection surface and one adjacent non-reflection surface.

As another example, regarding an integrated member including at least one curved surface, within the one curved surface, an area which guides light emitted from the plurality of light sources to the reading target area can be referred to as a reflection surface, while an area which does otherwise (an area which is not capable of guiding the light to the reading target area due to an arrangement relationship between the area and the plurality of the light sources or the reflection surface) can be referred to as a non-reflection surface. In this case, an angle is not formed between one reflection surface and one adjacent non-reflection surface, both of which are provided on the above curved surface.

In the case wherein an angle is formed between the two adjacent reflection surfaces, or between one reflection surface and one adjacent non-reflection surface, or between the two adjacent non-reflection surfaces, a problem arises when the angle is formed such that a sink mark is generated at a position other than a position where the angle is formed. Consequently, the manufacture of the reflection surface may be difficult. Therefore, when no angle or a gentle angle is formed, the above problem of the sink mark can be solved, thereby the manufacture is made easier.

Therefore, according to one embodiment of the present invention, neither the reflection surface nor the non-reflection surface is required to be a planar surface or a curved surface in terms of configuration. Specifically, as to a surface formed by a width direction and a height direction of the image reading apparatus, between one reflection surface of at least two reflection surfaces provided to face the plurality of the light sources, no angle or a gentle angle is formed. Thus, a defective illumination resulting from the sink mark can be prevented.

(Light Passing Section and Light Passing Port)

According to one embodiment of the present invention, the illumination optical system of the image reading apparatus includes a light passing section. The light passing section is an optical path where the reflected light from the document passes. The image of the document is read by the light which passes the light passing section.

The light passing section is preferably a light passing port which is an opening section similar to the reading target area of the reflection section in area. The constituent material of the light passing section can be a heretofore known material with a high optical transmittance appropriate for the image reading apparatus.

(A Light Source)

According to one embodiment of the present invention, a light source is preferably a light-emitting diode (LED) or an organic EL light source heretofore known.

In addition, it is desirable that a plurality of light sources be arrayed in the length direction of the reading target area, whereby the reading target area can be illuminated in the length direction.

Furthermore, a light-emitting direction of the light source is desirably in parallel with the document placing surface, thereby the document illuminating device can be thinned in a height direction. Here, the light-emitting direction refers to a direction wherein the light emits with the highest intensity.

(An Image Forming Optical System)

According to one embodiment of the present invention, an image forming optical system includes a plurality of mirrors and a readout lens and forms an image from the light reflected from the document passing the light passing section.

The mirror can be a member including a mirror or a mirror surface heretofore known. The lens can be a lens formed of glass heretofore known.

(A Sensor)

According to one embodiment of the present invention, a sensor is provided in the image forming section of the image forming optical system and is capable of reading the document image of the CCD.

(A Contact Glass)

According to one embodiment of the present invention, a contact glass whereon the document is placed is included in an image forming apparatus. Meanwhile, the contact glass can also be included in the image reading apparatus. The contact glass is of a plate shape and is desirably formed with glass, transparent resin or the like.

The preferred embodiments of the image reading apparatus of the present invention will be explained hereinafter with reference to the accompanying drawings.

Embodiment 1

FIGS. 1A to 1F illustrate an image reading apparatus according to a first embodiment of the present invention.

FIG. 1A illustrates a length direction and a width direction of the reading target area on a document placing surface.

Figure 1B:
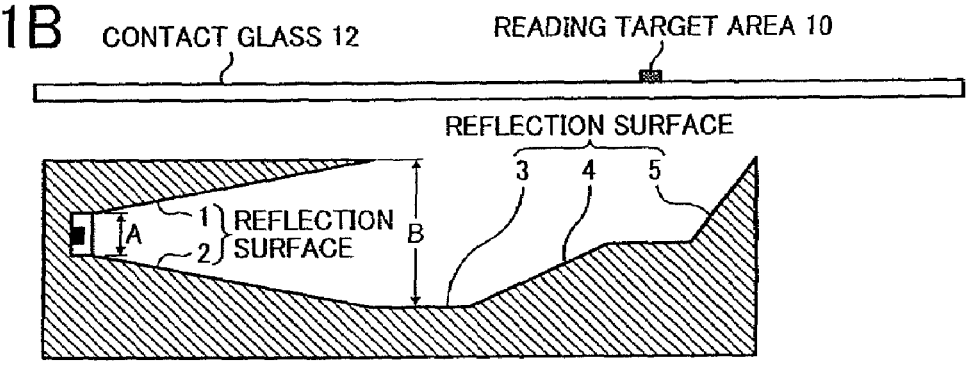
FIG. 1B is a profile schematic view illustrating a document illuminating device included in an image reading apparatus according to a first embodiment of the present invention.

FIG. 1B is a profile schematic view illustrating a configuration of the document illustrating device including a plurality of white LED light sources and a plurality of reflection surfaces, included in the image reading apparatus of the present invention (for the sake of illustration, a contact glass 12 is not shown).

Figure 1C:
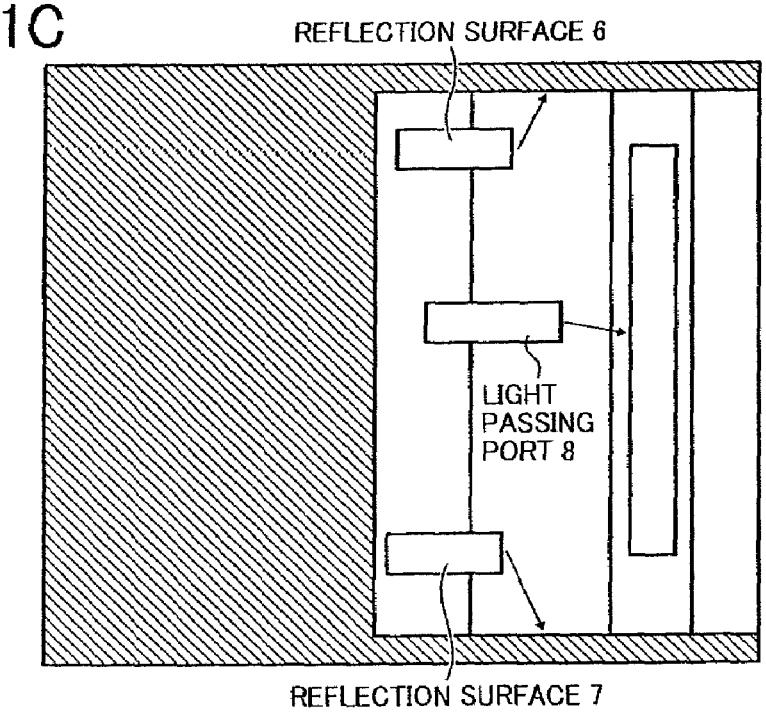
FIG. 1C is a top schematic view illustrating the document illuminating device included in the image reading apparatus according to the first embodiment of the present invention.
Figure 1D:
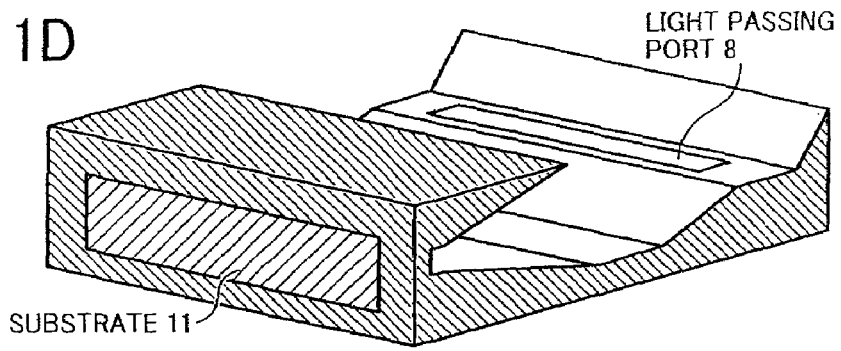
FIG. 1D is a perspective view illustrating a configuration of the document illuminating device included in the image reading apparatus according to the first embodiment of the present invention.
Figure 1E:
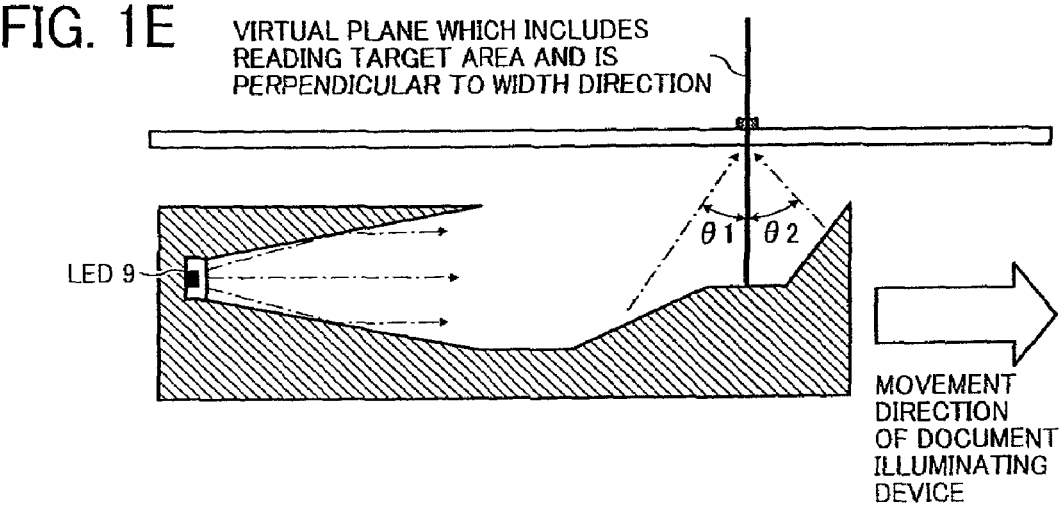
FIG. 1E is similar to FIG. 1B except that a direction wherein light is directed is illustrated.

However, the plurality of reflection surfaces (e.g. reflection surfaces 6 and 7) at both sides of the document illuminating device are omitted in order to clearly illustrate a configuration of the document illuminating device in FIGS. 1B, 1D and 1E.

Here, light for illumination can either be the light emitted from the plurality of white LEDs or mixed light of light emitted from the plurality of LEDs of two or more colors.

In FIG. 1B, a member painted in black is formed by plastic molding, etc. When the plurality of reflection surfaces are formed by vapor deposition of aluminum or coating, the number of processing steps is small, and thereby enables manufacture to be highly efficient. In this case, each reflection surface can also be formed via bonding a reflective tape to the above-mentioned member painted in black. The reflective tape is provided with high reflectivity via evaporation or the like on one side of a thin adhesive tape.

Unlike in FIG. 1A, in FIG. 1C, the document and the contact lens 12 are not shown in order to clearly illustrate the reflection surfaces 6 and 7 and a light passing port 8 in particular.

FIG. 1D is a perspective view illustrating an LED installed substrate 11, whereon the plurality of LEDs are installed. An LED 9 is installed on the LED installed substrate 11, which is installed in the document illuminating optical system via pressing, bonding, screwing or the like.

FIG. 1E and FIG. 1B are the same except that a direction wherein light proceeds is illustrated in FIG. 1E. As illustrated in a cross-section of FIG. 1E, diffusive light emitted from the plurality of LEDs is concentrated by reflection surfaces 1 and 2 and is guided to the reading target area by reflection surfaces 4 and 5. The light guided to the reading target area is angled to a virtual plane (a plane which includes the reading target area and is perpendicular to a movement direction of the document illuminating device) illustrated in FIG. 1E at θ1 and θ2, respectively. If a sine value of θ1 is positive, a sine value of θ2 is negative. (When $\sin(\theta 1)>0$, $\sin(\theta 2)<0$. Here, either θ1 or θ2 can be set to be positive or negative.)

According to the present embodiment, compared with the reflection surface 5, the reflection surface 4 is located closer to the plurality of LEDs and is angled to a light-emitting direction of the plurality of LEDs at a smaller degree. However, both the inclination angles above the reflection surfaces 4 and 5 are confined to be between 0° and 90°, as in the cases of a second embodiment to an eighth embodiment to be illustrated hereinafter.

Figure 1F:
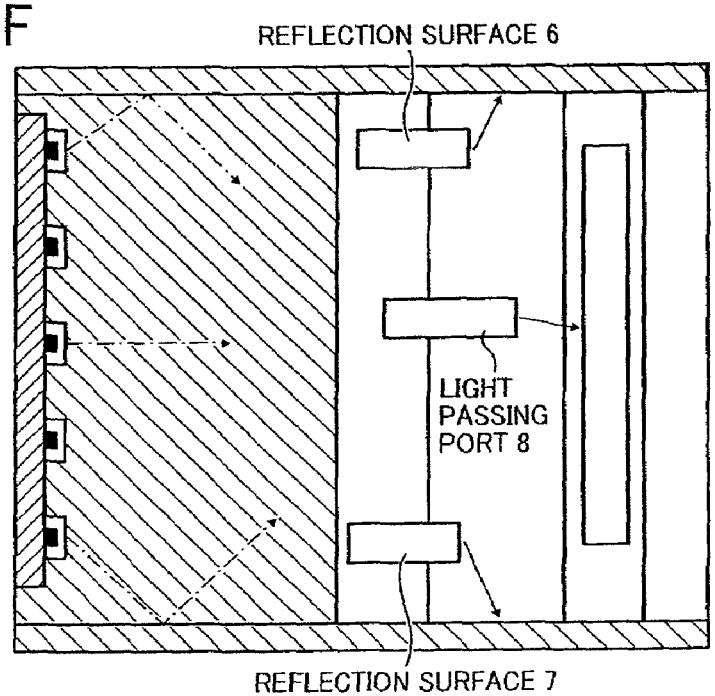
FIG. 1F is a top schematic view wherein a reflection surface 1 is not shown.

Being a top view as FIG. 1C, FIG. 1F illustrates reflection on the side clearly in particular via not showing the reflection surface 1. Although diffused light emitted from the LED 9 is not concentrated at the cross-section of FIG. 1F, the light is not diffused out of the illumination optical system via reflection by the reflection surfaces 6 and 7, as illustrated in FIG. 1F.

When the image reading apparatus is configured as illustrated in the above FIGS. 1A to 1F, some effects (i), (ii), (iii), (iv), (v), (vi) can be attained as follows.

(i) In the length direction (the main scanning direction of the image reading apparatus), a uniform illuminance irregularity is achieved and the light utilization efficiency is enhanced by the reflection surface 6 and the reflection surface 7. Since the light-emitting direction is arranged to be in parallel with the contact glass 12, the document illuminating device can be small-sized in the height direction (the direction which is perpendicular to the surface defined by the main scanning direction and the sub-scanning direction).

(ii) In the width direction (the sub-scanning direction of the image reading apparatus), light is concentrated by the reflection surface 1 and the reflection surface 2. Illumination from two directions can be realized via the reflection surface 4 and the reflection surface 5. Thus, the black shadow is eliminated even when an opened book, etc. is read, with the levitating part existing inevitably between pages due to the structure of the book, etc.

(iii) Since the reflection surface 4 and the reflection surface 5 are integrated with each other, even if the document illuminating device is moved, a positional relation between the reflection surface 4 and the reflection surface 5 is not varied accordingly. Thus, a variance in the illuminance distribution of the reading target area 10 in the width direction does not easily occur.

(iv) Since a concentration section including the reflection surface 1 and the reflection surface 2 and a reflection section including the reflection surface 4 and the reflection surface 5 are integrated with each other, and the positional relationship between the reflection surface 4 and the reflection surface 5 does not vary, the variance in the illuminance distribution of the reading target area in the width direction does not easily occur due to the light emitted from the plurality of light sources incident directly on or incident via the reflection surface 1 and the reflection surface 2 on the reflection surface 4 and the reflection surface 5.

(v) Since a reflection surface 3 is located in a position where the concentration member and the reflection member are connected, the reflection surface 3 functions both as the concentration section and the reflection section. (Some light emitted from the LED 9 is reflected by the reflection surface 3 before being reflected by the reflection surface 4, and then is incident on the reading target area 10; while other light emitted from the LED 9 is reflected by the reflection surface 3 and is incident on the reading target area 10.)

(vi) The concentration section includes a pair of mutually facing reflection surfaces (reflection surface 1 and the reflection surface 2), and is arranged such that a distance B, at a side wherefrom light is emitted, between the paired facing reflection surfaces, is larger than a distance A, at a side to which light emitted from the light source (the LED 9) is incident, between the above reflection surfaces. In addition, although the reflection surface 1 and the reflection surface 2 are planar surfaces, as illustrated in FIG. 1, the above two reflection surfaces are desirably approximately parabolic surfaces, on whose focus position the LED light source is located.

In addition, as illustrated above, the distance B is arranged to be larger than the distance A, thereby the light emitted from the LED light source becomes approximately parallel light before proceeding to the reflection section, as illustrated in FIG. 1E or FIG. 2.

Embodiment 2

A second embodiment is concerned with an image reading apparatus including the document illuminating device of the first embodiment.

FIG. 2 is a profile schematic view of the image reading apparatus according to the second embodiment of the present invention. (However, for the sake of illustration, the contact glass 12 is shown.)

According to this embodiment, the image reading apparatus is configured to comprise the document illuminating device of the first embodiment, four mirrors 16, a read out lens 13 and a CCD 14. All of these components are fixed respectively via pressing, bonding, screwing or the like to maintain a position thereof unchanged. The image reading apparatus is configured to be moved entirely to read the document.

As illustrated in FIGS. 1C, 1D and 1F in the first embodiment of the present invention, the light passing port is opened in the document illuminating device. The light from the document placing surface 15 passes the light passing port 8 and then is reflected by the four mirrors 16. Then an image is formed on the CCD 14 via the read out lens 13.

Although the reflection surface 4 and the reflection surface 5 are integrated with each other, so as not to shade the light from the document placing surface 15, since the light passing port 8 is arranged to form the image from light reflected from the document placing surface 15, the image forming cannot be influenced negatively. The size of the light passing port 8 can be obtained via a light ray tracing. Therefore, the reflection surface 4 and the reflection surface 5 do not need to be arranged separately to prevent light from being shaded.

Embodiment 3

A third embodiment is concerned with an image reading apparatus including the document illuminating device of the first embodiment. (However, for the sake of illustration, the contact glass 12 is shown.)

Figure 3:
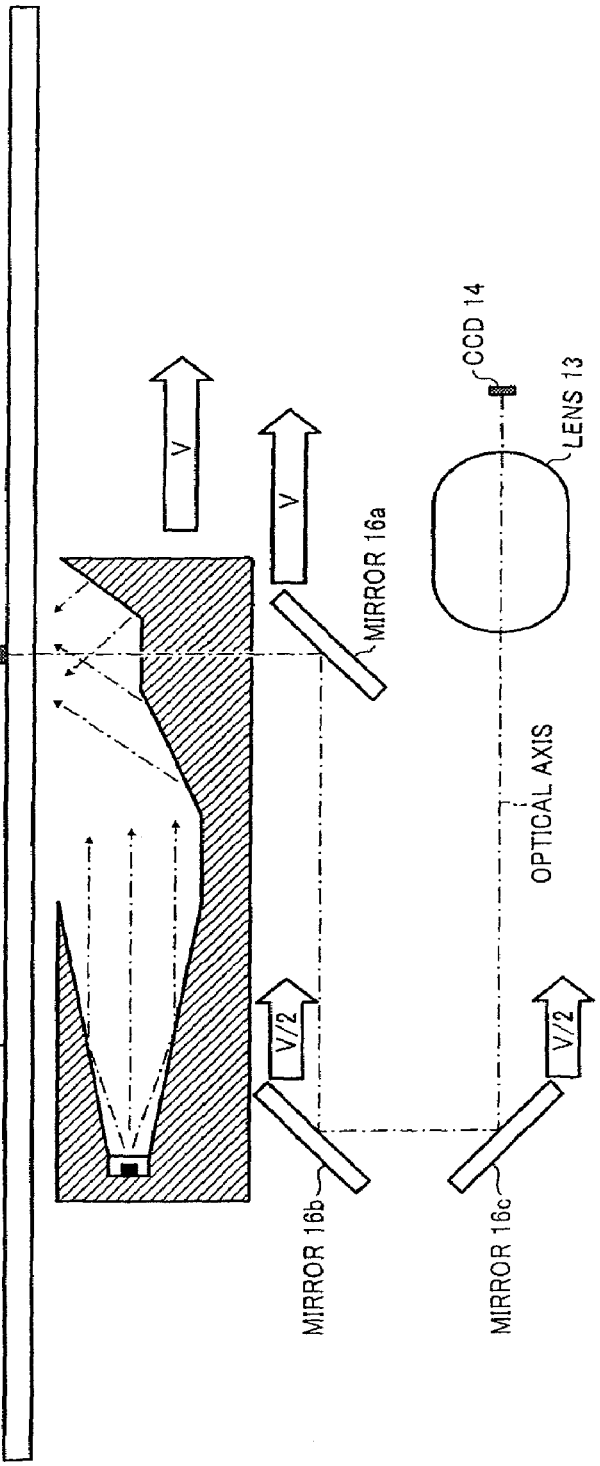
FIG. 3 is a profile schematic view of an image reading apparatus according to a third embodiment of the present invention.

FIG. 3 is a profile schematic view of the image reading apparatus according to the third embodiment of the present invention.

According to this embodiment, the image reading apparatus is configured to comprise the document illuminating device of the first embodiment, three mirrors 16a, 16b and 16c, the read out lens 13 and the CCD 14. The document illuminating device and the mirror 16a are moved at a velocity of V; while the mirrors 16b and 16c are moved at a velocity of ½V correspondingly, whereby the document is read.

In accordance with such a configuration, since an optical path from the document to the CCD 14 is not varied when the document illuminating device or the like is moved, the document can be read.

Embodiment 4

Figure 4:
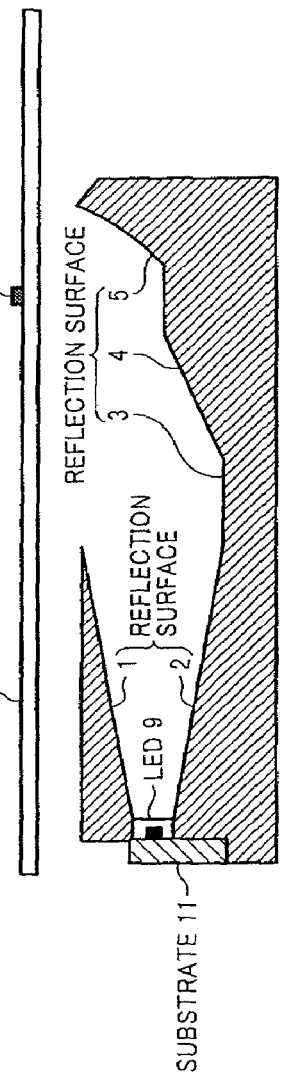
FIG. 4 is a profile schematic view of a document illuminating device included in an image reading apparatus according to a fourth embodiment of the present invention.

FIG. 4 is a profile schematic view illustrating the document illuminating device included in an image reading apparatus according to a fourth embodiment of the present invention.

A configuration of the image reading apparatus according to this embodiment differs from that of the image reading apparatus according to the first embodiment in the following two aspects (a) and (b).

(a) With respect to other reflection surfaces, the reflection surface 1 is configured separately. A member including the reflection surface 1 is post-installable to other members. Thus, when the document illuminating device is assembled, in the case wherein the illuminance distribution in the sub-scanning direction is worsened due to an unsatisfactory molding precision of the reflection surface 4 and the reflection surface 5, the illuminance distribution in the sub-scanning direction can be improved either via adjusting a location of the reflection surface 1, or via slightly altering the shape of the reflection surface 1.

Figure 13:
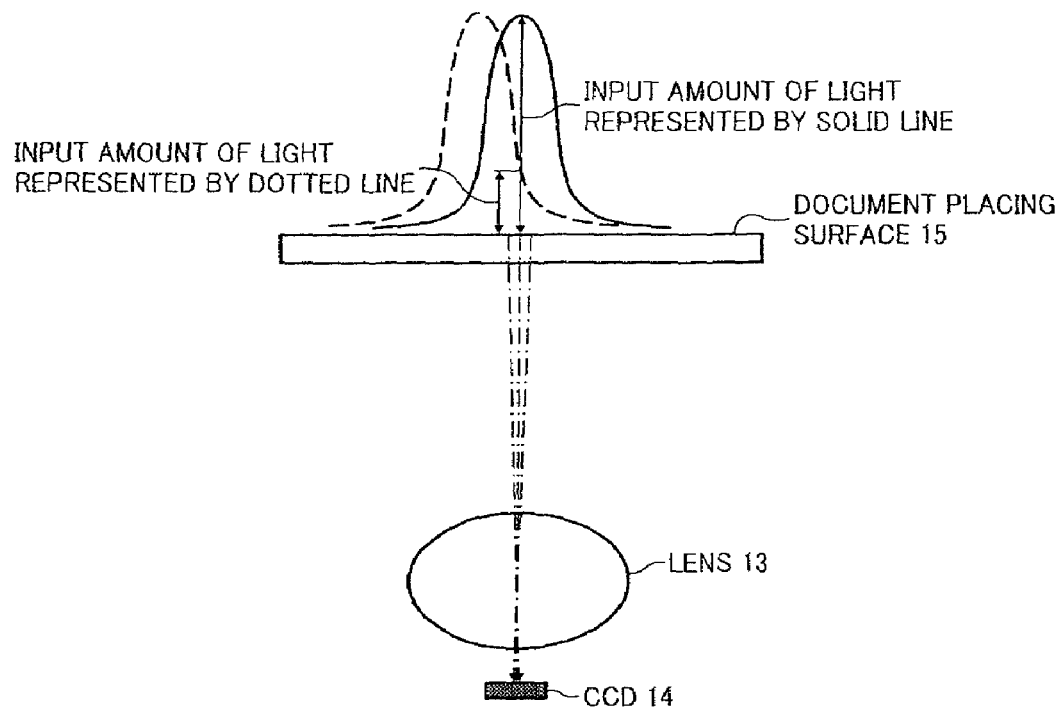
FIG. 13 is a diagram illustrating the conjugate positional relationship between the document placing surface and the CCD in the length direction of the document placing surface, wherein another example of an illuminance distribution on the document placing surface is illustrated by the solid line and the dotted line.
Figure 14:
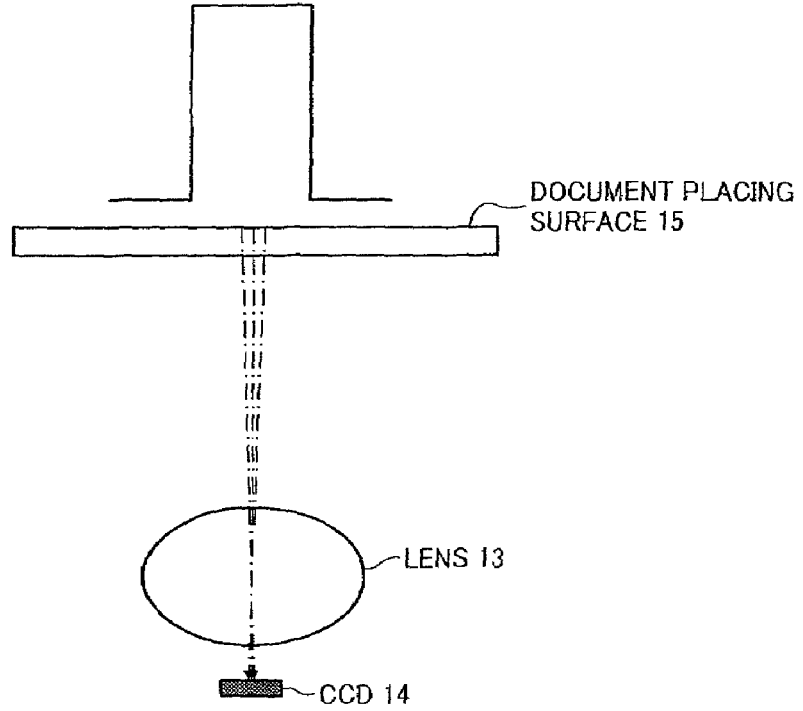
FIG. 14 is a diagram illustrating the conjugate positional relationship between the document placing surface and the CCD in the length direction of the document placing surface, wherein another example of an illuminance distribution on the document placing surface is illustrated by the solid line and the dotted line.
Figure 15:
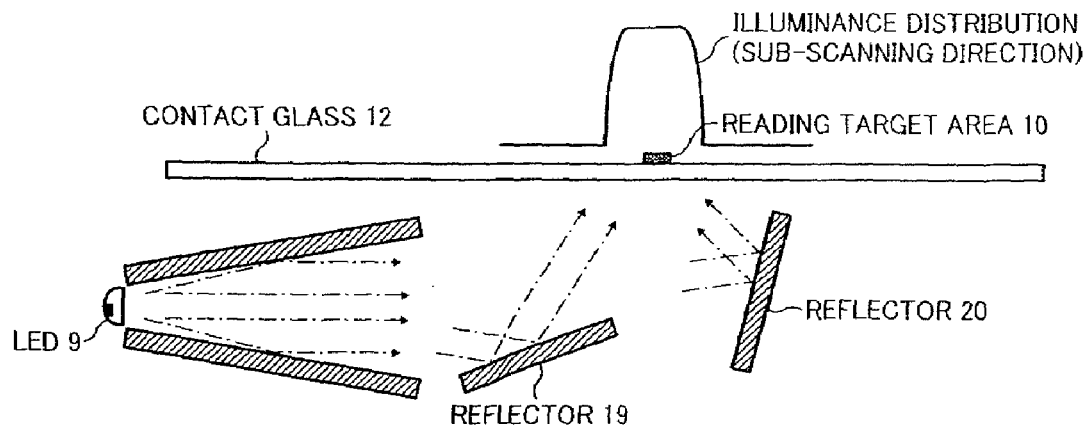
FIG. 15 is an exemplary schematic view illustrating the conventional image reading apparatus wherein a plurality of LEDs are employed.
Figure 16:
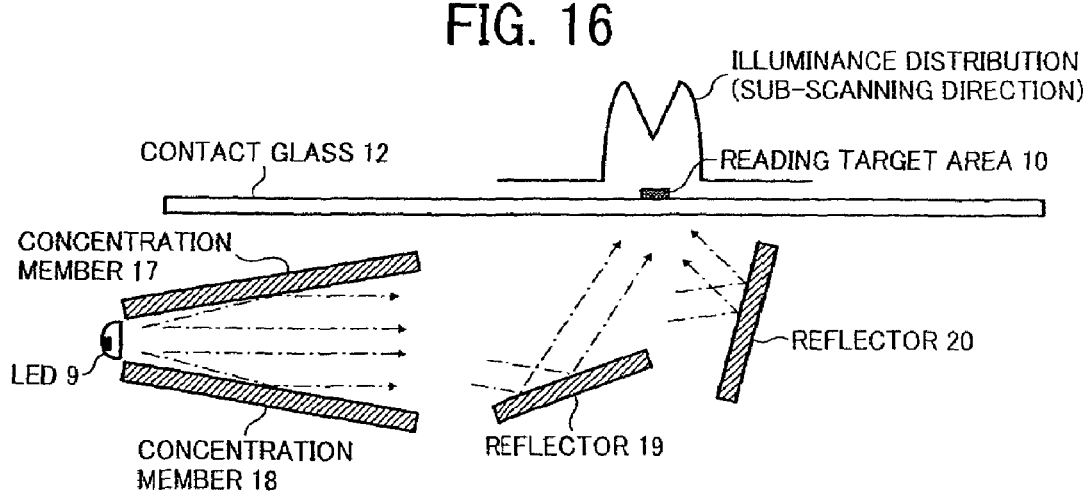
FIG. 16 is a schematic view illustrating the conventional image apparatus illustrated in FIG. 15, wherein a positional relationship of a plurality of reflectors is varied.
Figure 17:
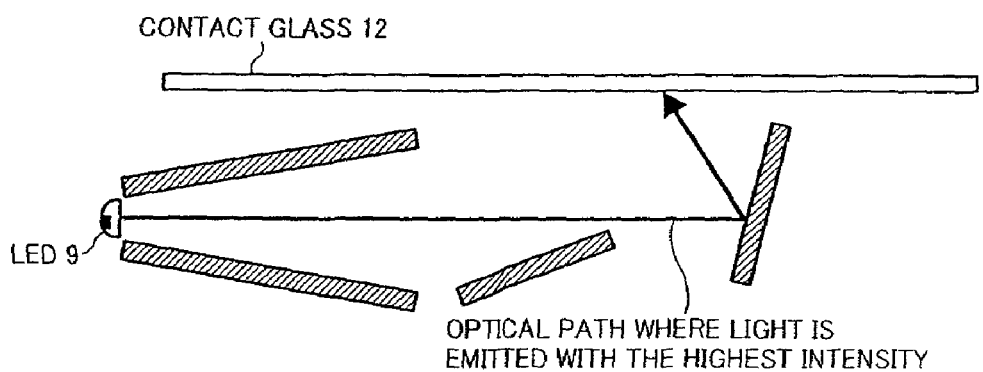
FIG. 17 illustrates an optical route where the light emits with the highest intensity of the image reading apparatus.

(b) The reflection surface 5 is configured to be of a curved shape. As illustrated in FIGS. 13 and 14, when the light is concentrated to the sub-scanning direction, a steep illuminance distribution (with a sharp-pointed peak) is formed undesirably. However, as illustrated above, the illuminance on the document placing surface is desirably high. Meanwhile, in the case of an illumination optical system in which high illuminance is achieved even with the same number of light sources, for the sake of energy conservation, the number of the LEDs is desirably reduced. As illustrated in FIG. 4 for example, the reflection surface 5 close to the document placing surface is made to be of a slightly curved shape, thereby the light is concentrated without any interference with the illuminance distribution in the sub-scanning direction. Therefore, both an enhancement in the illuminance and the reduction in cost can be expected. Nevertheless, when the brightness of the plurality of LEDs is enhanced, and thereby the high illuminance can be achieved, the reflection surface 5 can also be a planar surface accordingly.

Embodiment 5

Figure 5A:
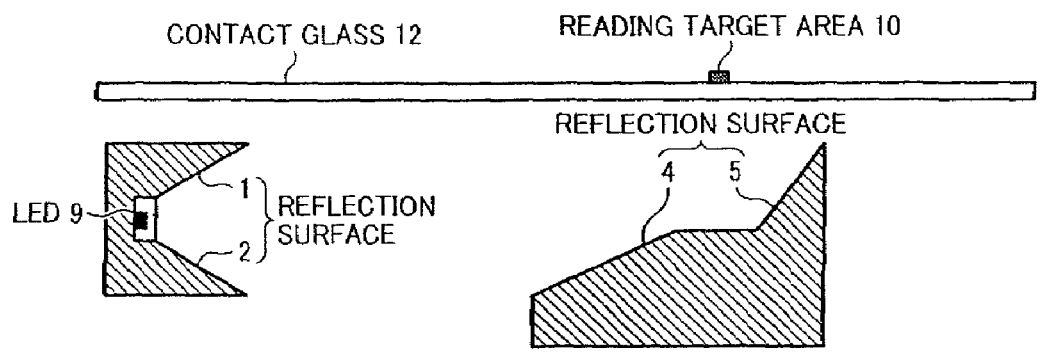
FIG. 5A is a profile schematic view of a document illuminating device included in an image reading apparatus according to a fifth embodiment of the present invention.

FIG. 5A is a profile schematic view illustrating a document illuminating device included in an image reading apparatus according to a fifth embodiment of the present invention.

Unlike the first embodiment of the present invention, according to the fifth embodiment of the present invention, concentration members including the reflection surfaces 1 and 2 are configured separately with respect to reflection members 4 and 5.

Here, the plurality of the concentration members are configured separately with respect to the plurality of the reflection members, whereby it becomes easier to integrate the LED 9 with the plurality of the concentration members, though the precision of the relative position declines between the plurality of the concentration members and the plurality of the reflection members when being moved. In addition, the illuminance distribution in the sub-scanning direction can be adjusted via altering the positional relationship between the plurality of the concentration members and the plurality of the reflection members.

Figure 5B:
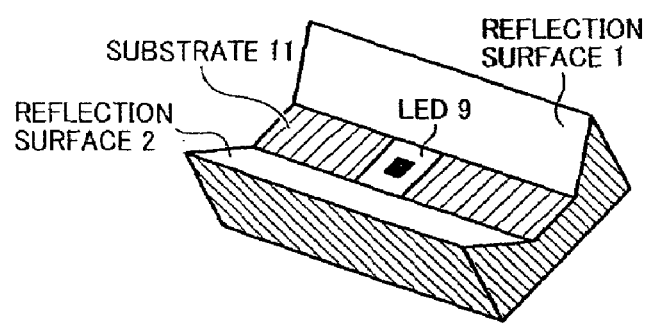
FIG. 5B is a perspective view illustrating a configuration of a concentration member included in the image reading apparatus according to the fifth embodiment of the present invention.

As illustrated in FIG. 5B as an example, as to the plurality of the concentration members in accordance with the fifth embodiment, when the LED 9 is arranged to the substrate 11, the reflection surfaces 1 and 2 can also be arranged. As illustrated in FIG. 5B, the LED 9 and the concentration members are integrally arranged, thereby extensive illumination in the main scanning direction can be realized. The substrate 11, the LED 9, and the reflection surfaces 1 and 2 are sealed by a resin, whereby environment resistance thereof is enhanced. In addition, the plurality of the concentration members being small-sized facilitates the seal by the resin.

Figure 5C:
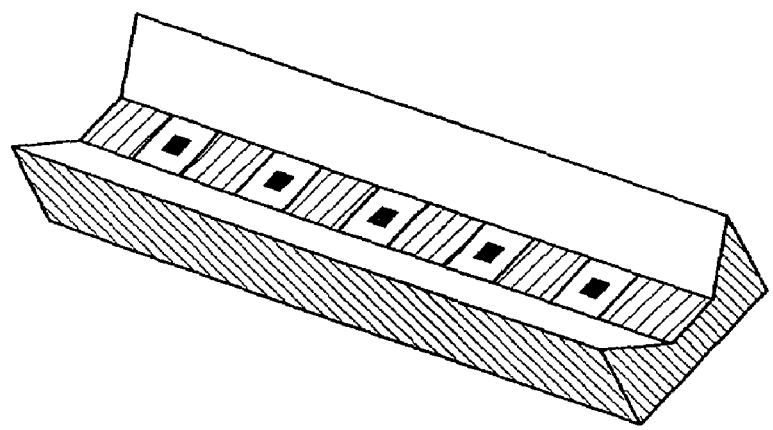
FIG. 5C is a perspective view illustrating another configuration of the concentration member included in the image reading apparatus according to the fifth embodiment of the present invention.

Meanwhile, FIG. 5C illustrates a transfiguration according to the fifth embodiment of the invention. In FIG. 5C, since a light source array is arranged on the substrate, the position of the plurality of the reflection members can be adjusted more easily with respect to the light source array and the plurality of the concentration members.

Embodiment 6

Figure 6:
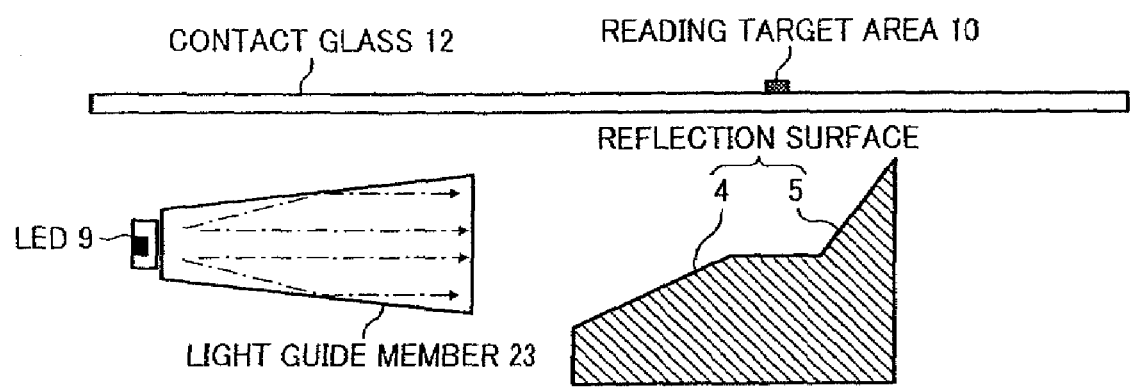
FIG. 6 is a profile schematic view illustrating a document illuminating device included in an image reading apparatus according to a sixth embodiment of the present invention.

FIG. 6 is a profile schematic view illustrating a document illuminating device included in an image reading apparatus according to a sixth embodiment of the present invention.

Instead of the plurality of reflection surfaces in the fifth embodiment, a light guide member 23, illustrated in FIG. 6, is employed as a concentration member in this embodiment. The light incident on the light guide member 23 is totally reflected by the respective surfaces thereof, and then is emitted towards the document placing surface via the plurality of reflection members.

According to the sixth embodiment of the present invention, although the concentration member can be molded of a transparent resin, etc., optical loss exists on both a light-incident surface and a light-emitting surface thereof. In addition, in order to retain the light guide member 23, an extra component may become undesirably necessary.

Here, the light guide member refers to an optical member made of an optical material such as glass or plastic, etc. which is capable of guiding the light incident thereinto towards the light-emitting surface via the total reflection. As illustrated in FIG. 6, the light guide member can be configured to concentrate the light in the sub-scanning direction. With respect to the light-incident surface, the light-emitting surface is of a long shape in the height direction. In addition, the light guide member can also be configured to concentrate the light in the main scanning direction.

Embodiment 7

Figure 7A:
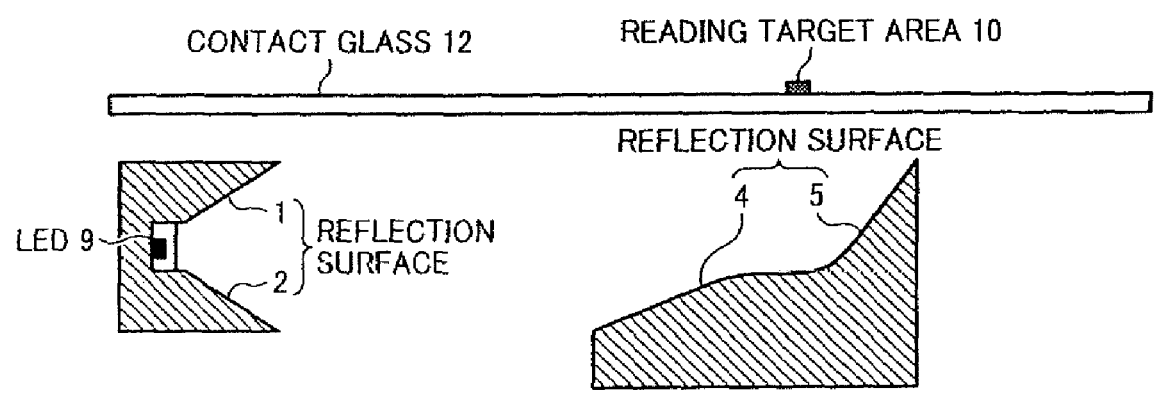
FIG. 7A is a profile schematic view illustrating a document illuminating device included in an image reading apparatus according to a seventh embodiment of the present invention.
Figure 7B:
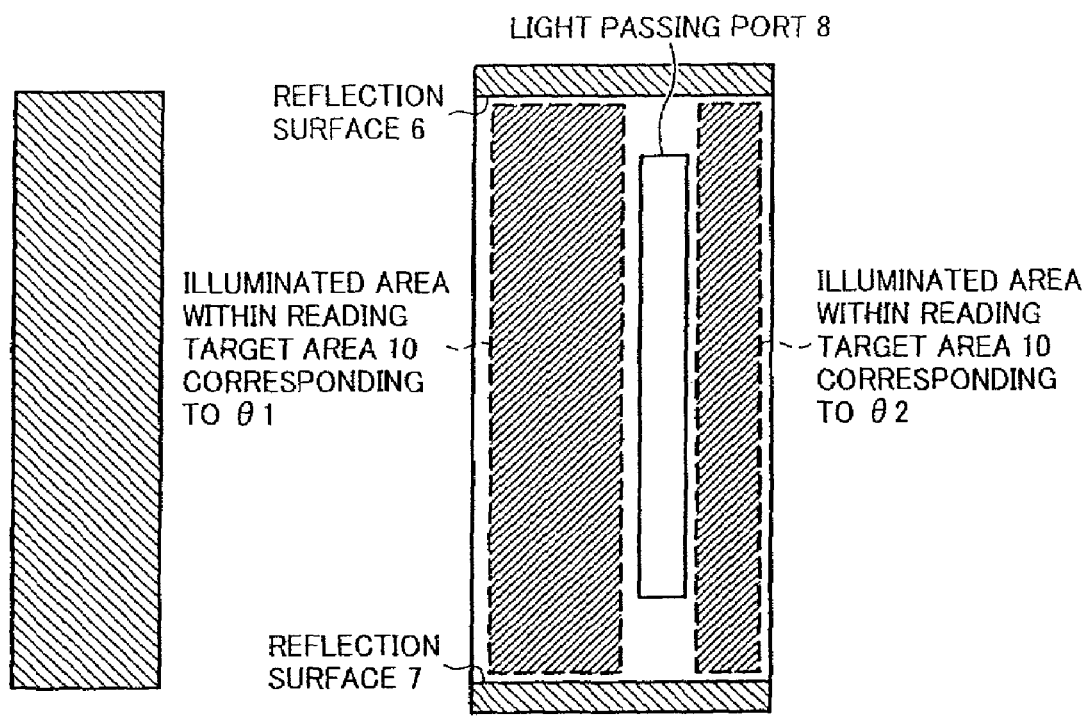
FIG. 7B is a top schematic view illustrating the document illuminating device included in the image reading apparatus according to the seventh embodiment of the present invention.
Figure 7C:
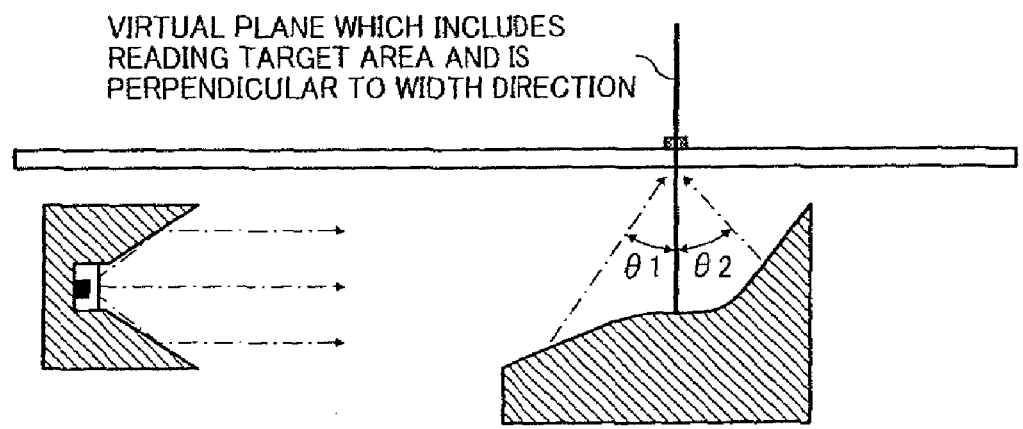
FIG. 7C is similar to FIG. 7A except that a direction wherein light is directed is illustrated.

FIGS. 7A, 7B and 7C illustrate a document illuminating device included in an image reading apparatus according to a seventh embodiment of the present invention.

Compared with the fifth embodiment, this embodiment concerns a transfiguration of the plurality of the reflection members including the reflection surface 4 and the reflection surface 5.

As illustrated in the above six embodiments, when the angle is distinctly formed between the respective surfaces of either the plurality of the reflection surfaces, or the plurality of the non-reflection surfaces, due to a molding condition, the problem arises such that the sink mark is generated at a position other than the position where the angle is formed. Consequently, the manufacture of the plurality of reflection surfaces may be difficult.

Considering the above-mentioned problem, as illustrated in FIG. 7A, in a surface comprising the width direction and the height direction of the image reading apparatus, within the plurality of the reflection members, the surfaces arranged to face the LED 9 (light source) are formed into one gently sloped surface instead of being delimited distinctly. In this case, as illustrated in FIG. 7B, the one gently sloped surface is divided into a plurality of areas by each angle of the illumination light emitted from the gently sloped surface, each of which is deemed as one reflection surface (or one non-reflection surface).

In terms of the positional relationship, the divided plurality of reflection surfaces are configured in such a manner that an optimum illustration distribution of the reading target area is obtained within the one gently sloped surface, whereby the same illumination can be expected as that in the fifth embodiment.

According to the seventh embodiment of the present invention, within the plurality of reflection members, the surfaces arranged to face the LED 9 (light source) are formed into one gently sloped surface instead of being delimited distinctly, whereby the defective illumination resulting from the sink mark can be prevented.

Embodiment 8

Figure 8:
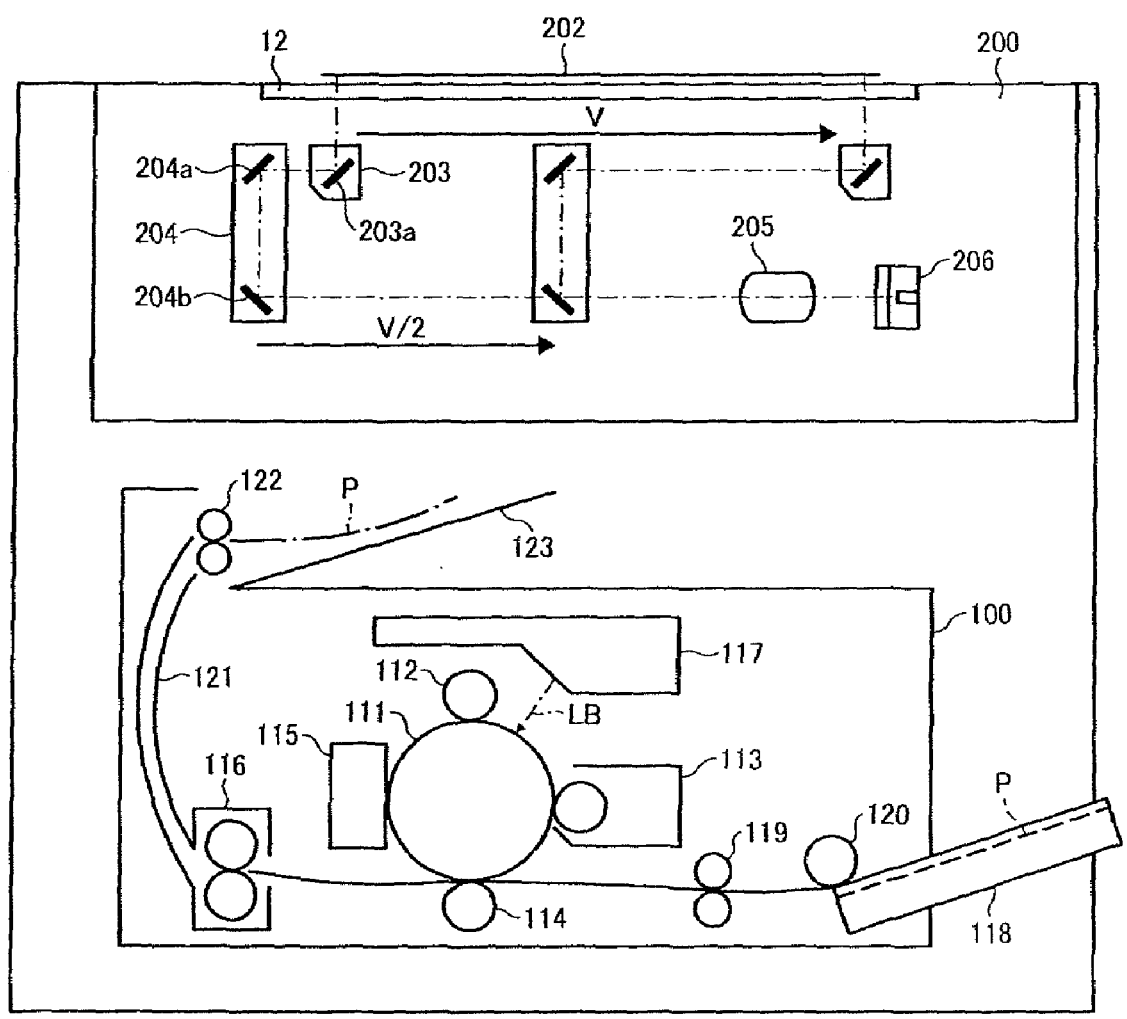
FIG. 8 illustrates a schematic structure of an image forming apparatus provided with the image reading apparatus according to the present invention.
Figure 9:
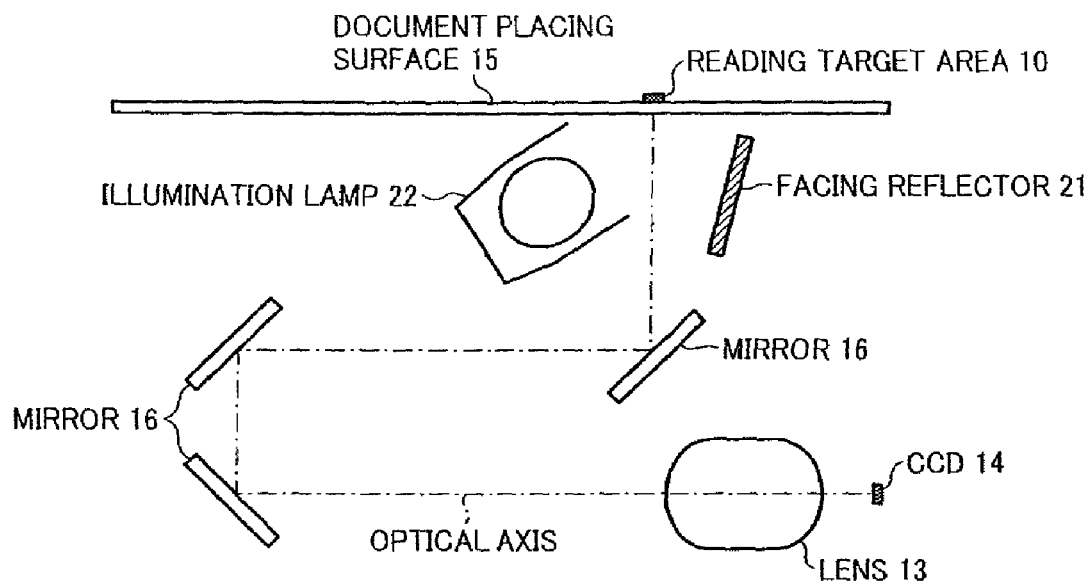
FIG. 9 is a schematic view illustrating a configuration of a conventional image reading apparatus.
Figure 10:
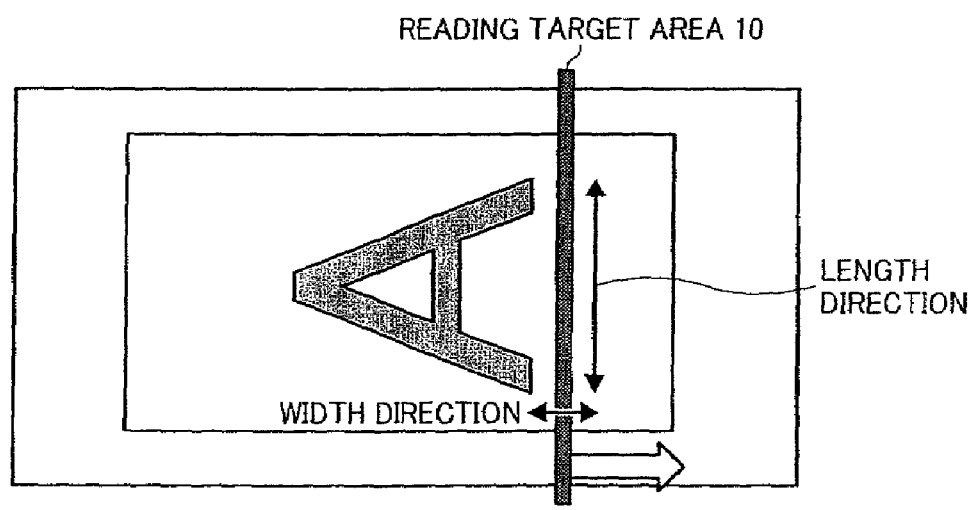
FIG. 10 is a top view illustrating a document placing surface of FIG. 9.
Figure 11:
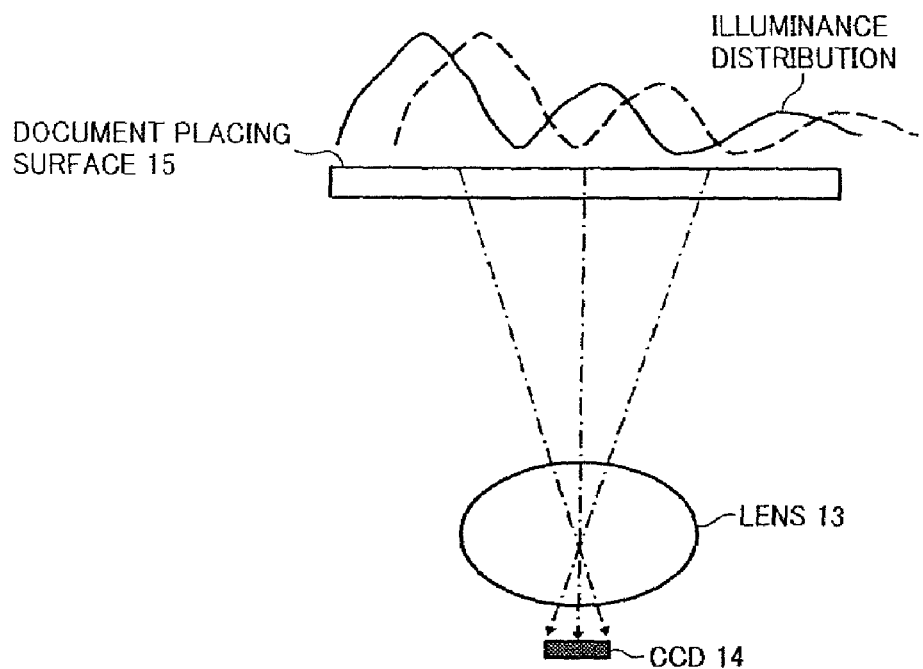
FIG. 11 is a diagram illustrating a conjugate positional relationship between the document placing surface and the CCD in a length direction of the document placing surface, wherein an example of an illuminance distribution on the document placing surface is illustrated by a solid line and a dotted line.
Figure 12:
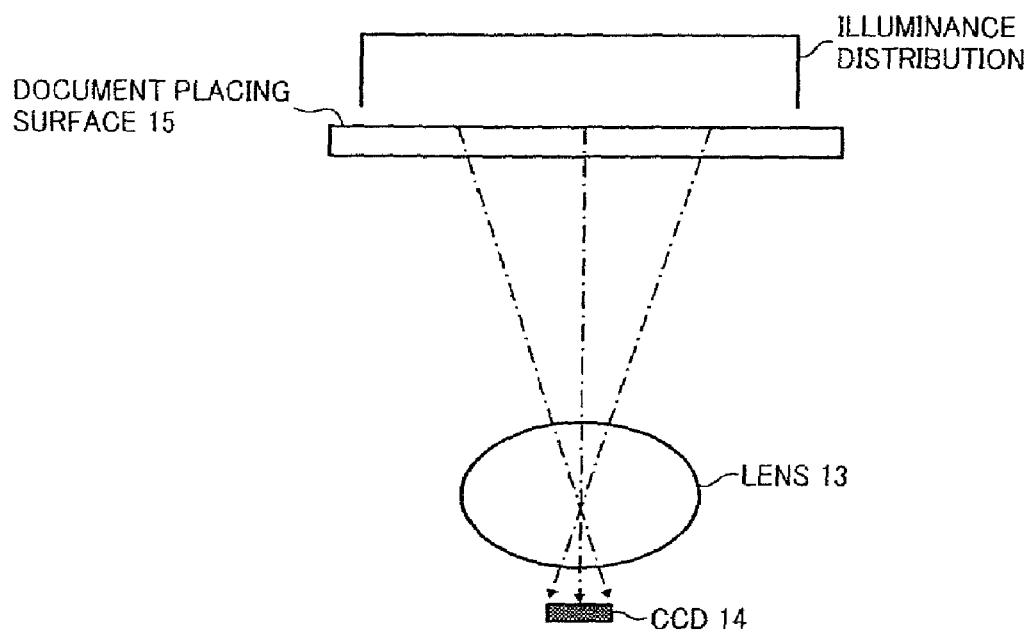
FIG. 12 is a diagram illustrating the conjugate positional relationship between the document placing surface and the CCD in the length direction of the document placing surface, wherein another example of an illuminance distribution on the document placing surface is illustrated by the solid line and the dotted line.

FIG. 8 illustrates a schematic structure of an image forming apparatus including an image reading apparatus.

In FIG. 8, reference numeral 100 represents the image forming apparatus, and reference numeral 200 represents the image reading apparatus. Other reference numerals will be referred to directly in the following illustration.

In the image reading apparatus 200, a document 202 is disposed on the contact glass 12 and is illuminated by an illuminating section (not shown) provided at a first travelling body 203 arranged under the contact glass 12. Any illuminating section (the plurality of light sources and the document illuminating device) illustrated in the above-mentioned embodiments can be employed in this illuminating section. Reflected light from the document 202 is reflected by a first mirror 203a of the first traveling body 203, and then is reflected by a first mirror 204a and a second mirror 204b of a second traveling body 204, followed by being guided to a reducing imaging lens 205, and imaged on a line sensor 206. In addition, the present invention can also be applied to a color image reading apparatus via providing the line sensor 206 corresponding to colors of RGB respectively with the constitution unchanged.

When the document is read in a length direction thereof, the first traveling body 203 is moved to the right at a velocity of V, and concurrently, the second traveling body 204 is moved to the right at a velocity of ½ V, which is a half of the velocity of the first travelling body 203. Thus, an optical path length from the document 202 to the line sensor 206 is kept constant, and the entire document can be read out at a constant magnification.

In general, a plurality of LED elements are arrayed to be employed in the document illuminating device, included in the image reading apparatus.

The image forming apparatus 100 includes a latent image carrier 111 in a drum shape. In the surroundings of the latent image carrier 111, there are arranged a charge roller 112 as a charging device, a developing device 113, a transfer roller 114, and a cleaning device 115. A "corona charger" can also be used as the charging device. In addition, there is provided a light scanning device 117 which receives document information from outside such as an image reading section and performs light scanning by laser beam LB. "Exposure dependent on optical writing by the laser beam" is performed between the charge roller 112 and the developing device 113.

When an image needs to be formed, the latent image carrier 111, which is a photoconductive photoreceptor, is rotated clockwise at a constant speed. A surface of the latent image carrier 111 is uniformly charged by the charge roller 112, and is exposed depending on the optical writing of the laser beam LB of the optical scanning device 117, whereby an electrostatic latent image is formed. The formed electrostatic latent image includes a so-called negative latent image after an image area is exposed and a so-called positive latent image after a non-image area is exposed. Either of the above-mentioned electrostatic latent images can be visualized using a toner in the developing device 113. A color image can also be formed via providing four developing devices, respectively, each of which being the developing device 113, for four colors—yellow (Y), cyan (C), magenta (M) and black (Bk).

A cassette 118 storing a transfer paper P is provided detachably from a main body of the image forming apparatus 100. When the cassette 118 is attached to the image forming device 100, as illustrated in FIG. 8, one sheet of the transfer paper on the top is fed by a paper-feeding roller 120, and an end of the one fed sheet of the transfer paper P is caught by a pair of resist rollers 119. The pair of resist rollers 119 feeds the transfer paper P to a transfer section synchronously with a timing of a toner image being moved onto the latent image carrier 111 to a transfer position. The fed transfer paper P is superimposed with the toner image in the transfer section and the toner image is electrostatically transferred by an action of the transfer roller 114. The transfer paper P transferred with the toner image is sent to a fixing device 116 wherein the toner image is fixed, and then is ejected onto a tray 123 by a pair of paper discharging rollers 122, after passing through a conveying path 121. After the toner image is transferred, the surface of the latent image carrier 111 is cleaned by a cleaning device 115 to remove the residual toner and paper dust or the like.

According to the above-mentioned eight embodiments of the present invention, the image reading apparatus and the image forming apparatus are small-sized, wherein the number of the plurality of the light sources is small. The variance in the illuminance distribution when being driven can be expected to be suppressed.

According to one embodiment of the present invention, some effects can be obtained as follows.

The image reading apparatus and the image forming apparatus including the image reading apparatus can be configured to be small-sized, wherein the plurality of light sources are small in number, and the variance in the illuminance distribution can be suppressed when being driven.

Although the present invention has been described in terms of exemplary embodiments, it is not limited thereto. It should be appreciated that various changes and modifications can be made to the embodiments by persons skilled in the art without departing from the scope of the present invention as defined by the following claims.

What is claimed is:

1. An image reading apparatus comprising:
a plurality of light sources to illuminate a document;
an illumination optical system to guide light emitted from the plurality of light sources to a reading target area in a substantially rectangular shape having a length and a width;
a document illuminating device which is moved in a direction of the width to illuminate the entire document;
an image forming optical system to image light reflected from the document; and
a sensor provided in an image forming section of the image forming optical system to read the image of the document,
wherein the illumination optical system includes a concentration section to control light diffusion, and a reflection section to illuminate the document by light from a plurality of directions,
wherein the reflection section includes at least two integrally configured reflection surfaces, in which a sine value of an angle of light reflected from at least one reflection surface is positive, while a sine value of an angle of light reflected from the rest of at least one reflection surface is negative, with the angle of the reflected light referring to an angle formed when the light reflected from the reflection surface is angled to a virtual plane, which includes the reading target area and is perpendicular to the width direction, and with either side with respect to the virtual plane being set to be positive.

2. The image reading apparatus according to claim 1, wherein the illumination optical system includes a light passing section through which light reflected from the document is passed partly, and image reading is performed by the passed light.

3. The image reading apparatus according to claim 2, wherein the light passing section is a light passing port provided in the reflection section.

4. The image reading apparatus according to claim 1, wherein the at least two reflection surfaces are arranged to face the plurality of light sources, in which with respect to a light-emitting direction of the plurality of light sources, at least one reflection surface, arranged to be on a side closer to the plurality of light sources, is angled by a smaller degree, the degree being confined to be between 0° and 90°; the light-emitting direction referring to a direction wherein light is emitted with the highest intensity.

5. The image reading apparatus according to claim 1, wherein the reflection section includes a plurality of integrally configured reflection members.

6. The image reading apparatus according to claim 1, wherein the concentration section and the reflection section are integrally configured.

7. The image reading apparatus according to claim 1, wherein at least one component constituting the concentration section is integrated with the reflection section.

8. The image reading apparatus according to claim 1, wherein the concentration section includes a plurality of reflection surfaces.

9. The image reading apparatus according to claim 8, wherein
the concentration section includes paired facing reflection surfaces, which are arranged such that a distance B, at a side wherefrom light is emitted, between the paired facing reflection surfaces, is larger than a distance A, at a side to which light is emitted from the plurality of light sources.

10. The image reading apparatus according to claim 1, wherein the reflection surface is a planar surface.

11. The image reading apparatus according to claim 1, wherein at least one of the reflection surfaces has a curved shape.

12. The image reading apparatus according to claim 1, wherein the plurality of reflection surfaces are formed by evaporation.

13. The image reading apparatus according to claim 1, wherein the plurality of reflection surfaces are formed by coating.

14. The image reading apparatus according to claim 1, wherein each reflection surface is formed via bonding a tape with high reflectivity.

15. The image reading apparatus according to claim 1, wherein the plurality of light sources are a plurality of light-emitting diodes.

16. The image reading apparatus according to claim 1, wherein the plurality of light sources are a plurality of organic EL light sources.

17. The image reading apparatus according to claim 1, wherein the plurality of light sources are arrayed in a length direction of the reading target area.

18. The image reading apparatus according to claim 1, wherein the light-emitting direction is in parallel with a document placing surface, the light-emitting direction referring to the direction wherein light is emitted with the highest intensity.

19. An image forming apparatus wherein the image reading apparatus as recited in claim 1 is provided.

* * * * *